US009288077B1

(12) United States Patent
Ma et al.

(10) Patent No.: US 9,288,077 B1
(45) Date of Patent: Mar. 15, 2016

(54) CLUSTER FILE SYSTEM WITH SERVER BLOCK CACHE

(71) Applicant: EMC Corporation, Hopkinton, MA (US)

(72) Inventors: Gang Ma, West Roxbury, MA (US); Sorin Faibish, Newton, MA (US); James M. Pedone, Jr., West Boylston, MA (US); John M. Bent, Los Alamos, NM (US); Tao Peng, Beijing (CN)

(73) Assignee: EMC Corporation, Hopkinton, MA (US)

( * ) Notice: Subject to any disclaimer, the term of this patent is extended or adjusted under 35 U.S.C. 154(b) by 426 days.

(21) Appl. No.: 13/630,574

(22) Filed: Sep. 28, 2012

(51) Int. Cl.
  *G06F 15/16* (2006.01)
  *H04L 12/58* (2006.01)
  *H04L 29/08* (2006.01)

(52) U.S. Cl.
  CPC .......... *H04L 12/5835* (2013.01); *H04L 51/066* (2013.01); *H04L 67/28* (2013.01); *H04L 67/2823* (2013.01); *H04L 67/2842* (2013.01)

(58) Field of Classification Search
  CPC ... H04L 12/5835; H04L 51/066; H04L 67/28; H04L 67/2823; H04L 67/2842
  USPC .................................. 709/203, 219, 232, 246
  See application file for complete search history.

(56) References Cited

U.S. PATENT DOCUMENTS

| 7,418,465 | B1 | 8/2008 | Lewis et al. | |
|---|---|---|---|---|
| 7,752,173 | B1 * | 7/2010 | Gole ............................. | 707/654 |
| 7,856,530 | B1 | 12/2010 | Mu | |
| 2001/0002480 | A1 * | 5/2001 | Dekoning et al. ............ | 711/130 |
| 2003/0212863 | A1 * | 11/2003 | Ganguly et al. ............... | 711/118 |
| 2004/0054748 | A1 * | 3/2004 | Ackaouy et al. .............. | 709/214 |
| 2004/0153576 | A1 * | 8/2004 | Hansmann et al. ........... | 709/248 |
| 2005/0289252 | A1 | 12/2005 | Kim et al. | |
| 2006/0236068 | A1 | 10/2006 | Li et al. | |
| 2007/0250552 | A1 * | 10/2007 | Lango et al. .................. | 707/205 |
| 2009/0204766 | A1 * | 8/2009 | Jacobi et al. .................. | 711/133 |
| 2011/0320552 | A1 * | 12/2011 | Friedman et al. ............. | 709/206 |
| 2012/0005353 | A1 | 1/2012 | Edecker et al. | |

(Continued)

OTHER PUBLICATIONS

Daemon, Wikibon. "Squinting through the Glare of Project Lightning." Feb. 17, 2012 <http://wikibon.org/wiki/v/Squinting_through_the_Glare_of_Project_Lightning>.*

(Continued)

*Primary Examiner* — Liangche A Wang
*Assistant Examiner* — Johnny Aguiar
(74) *Attorney, Agent, or Firm* — Ryan, Mason & Lewis, LLP

(57) ABSTRACT

A cluster file system comprises a plurality of clients and a plurality of servers configured to communicate over a network. A given server of the cluster file system interfaces with an associated storage array, and comprises a block cache and a request translator. The request translator is configured to translate input-output requests in a protocol of the cluster file system to a format suitable for use with the block cache. The cluster file system may more particularly comprise a Lustre file system, and the given server may comprise a metadata server or an object storage server of the Lustre file system. In such an embodiment, the request translator is more particularly configured to translate Lustre client input-output requests directed to the storage array into block input-output requests that are processed by the block cache. The block cache is illustratively implemented using a VFCache or other type of server flash cache.

17 Claims, 2 Drawing Sheets

(56) References Cited

U.S. PATENT DOCUMENTS

| | | | |
|---|---|---|---|
| 2012/0005452 A1* | 1/2012 | Aral et al. | 711/206 |
| 2012/0310892 A1* | 12/2012 | Dam et al. | 707/659 |
| 2013/0205097 A1* | 8/2013 | Flynn et al. | 711/142 |
| 2013/0226887 A1* | 8/2013 | Braam et al. | 707/697 |

OTHER PUBLICATIONS

EMC Corporation, "Server Flash Cache for Superior Performance, Intelligence, and Protection of Mission-Critical Data," May 2012, 3 pages.

EMC Corporation, "Meeting the Needs of the Most-Demanding Applications with the World's Best NAS Performance," EMC Celerra Multi-Path File System (MPFS), Nov. 2009, 4 pages.

EMC Corporation, "Using VNX Multi-Path File System, P/N 300-013-460 Rev. 01," EMC VNX Series, Release 7.1, Jul. 2012, 64 pages.

EMC Corporation, "Introduction to EMC VFCache," White Paper, Feb. 2012, 31 pages.

Cluster File Systems, Inc., "Lustre: A Scalable, High-Performance File System," Nov. 2002, 13 pages.

Feiyi Wang et al., "Understanding Lustre Filesystem Internals," Tech Report: ORNL/TM-2009/117, Apr. 2010, 95 pages.

EMC Corporation, "Server Flash Cache for Superior Performance, Intelligence, and Protection of Mission-Critical Data," Data Sheet, 2012, 3 pages.

EMC Corporation, "Considerations for Choosing SLC Versus MLC Flash," EMC Technical Notes, P/N 300-013-740, Rev. A01, Jan. 2012, 9 pages.

EMC Corporation, "EMC VFCache Accelerates Oracle, EMC VFCache, EMC Symmetrix VMAX and VMAXe, Oracle Database 11g," EMC Solutions Group, White Paper, Jan. 2012, 13 pages.

EMC Corporation, "EMC VFCache Accelerates Oracle, EMC VFCache, EMC VNX, EMC FAST Suite, Oracle Database 11g," EMC Solutions Group, White Paper, Jan. 2012, 15 pages.

EMC Corporation, "EMC VFCache Accelerates Microsoft SQL Server, EMC VFCache, EMC VNX, Microsoft SQL Server 2008," EMC Solutions Group, White Paper, Jan. 2012, 13 pages.

EMC Corporation, "EMC XtremCache Accelerates Virtualized Oracle, EMC XtremSF, EMC XtremCache, EMC Symmetrix VMAX, EMC FAST VP, VMware vSphere, Oracle Database 11g," EMC Solutions Group, VMWARE Partner Technology Alliance, White Paper, Dec. 2013, 17 pages.

EMC Corporation, "EMC XtremCache Accelerates Oracle, EMC XtremSF, EMC XtremCache, EMC VNX, EMC FAST Suite, Oracle Database 11g," EMC Solutions, Oracle Platinum Partner, White Paper, Sep. 2014, 15 pages.

Demartek, "EMC VFCache Flash Caching Solution Evaluation," www.demartek.com, Jan. 2012, 15 pages.

Francois Kaplan, "Flash Memory Moves from Niche to Mainstream," Chip Design Magazine, http://chipdesignmag.com/display.php?articleID-436, 2014, 12 pages.

EMC Corporation, "EMC Xtrem Family, XtremCache, v2.1," EMC Release Notes, P/N 302-001-871, Rev. 01, Dec. 2014, 12 pages.

EMC Corporation, "EMC Xtrem Family, XtremCache, v2.1," EMC User Guide, P/N 302-001-869, Rev. 01, Dec. 2014, 222 pages.

EMC Corporation, "EMC Xtrem Family, XtremCache, v2.1," EMC Installation Guide, P/N 302-001-870, Rev. 01, Dec. 2014, 130 pages.

EMC Corporation, "Configuring ScaleIO 1.31.X and XtremCache 2.1, EMC ScaleIO," EMC Technical Note, P/N 302-001-858, Rev. 02, Jan. 2015, 7 pages.

\* cited by examiner

CLUSTER FILE SYSTEM WITH SERVER BLOCK CACHE

FIELD

The field relates generally to data storage, and more particularly to cluster file systems.

BACKGROUND

A cluster file system allows multiple client devices to share access to files over a network. One well-known cluster file system is the Lustre file system. Lustre is a Linux-based high performance cluster file system utilized for computer clusters ranging in size from small workgroup clusters to large-scale, multi-site clusters. Lustre can readily scale to support tens of thousands of clients, petabytes of storage, and hundreds of gigabytes per second of aggregate input-output (IO) throughput. Due to its high performance and scalability, Lustre is utilized in many supercomputers, as well as other complex computing environments, including large enterprise data centers.

There are a number of drawbacks to conventional Lustre implementations. For example, metadata servers and object storage servers in such arrangements generally do not incorporate an efficient caching mechanism. Instead, IO operations on these servers are generally performed directly with back-end storage arrays. To the extent caching is provided in a metadata server or object storage server of a Lustre file system or other similar cluster file system, it is typically implemented in a Linux kernel of the server and is therefore limited in both size and functionality. Moreover, Lustre does not include efficient failure protection modes, and can therefore suffer from excessive recovery latency upon certain types of failures, such as failures in metadata servers.

Accordingly, despite the many advantages of Lustre file systems and other similar cluster file systems, a need remains for additional improvements, particularly with regard to IO operations and failure recovery. For example, further acceleration of IO operations, leading to enhanced system performance relative to conventional arrangements, would be desirable.

SUMMARY

Illustrative embodiments of the present invention provide cluster file systems that implement block caching functionality in servers of the systems, such as object storage servers and metadata servers of a Lustre file system, so as to provide significant improvements in IO performance and failure recovery relative to conventional arrangements.

In one embodiment, a cluster file system comprises a plurality of clients and a plurality of servers configured to communicate over a network. A given server of the cluster file system interfaces with an associated storage array, and comprises a block cache and a request translator. The request translator is configured to translate IO requests in a protocol of the cluster file system to a format suitable for use with the block cache.

The cluster file system may more particularly comprise a Lustre file system, and the given server may comprise a metadata server or an object storage server of the Lustre file system. In an arrangement of this type, the request translator of the metadata server or object storage server may be more particularly configured to translate Lustre client IO requests directed to the associated storage array into block IO requests that are processed by the block cache.

The block cache is illustratively implemented using a VFCache or other type of server flash cache.

One or more of the illustrative embodiments described herein exhibit enhanced performance relative to conventional arrangements. For example, use of a block cache within a metadata server or an object storage server that accesses an associated storage array overcomes disadvantages that could otherwise arise when performing caching in a Linux kernel of a metadata server or an object storage server.

DETAILED DESCRIPTION

Illustrative embodiments of the present invention will be described herein with reference to exemplary cluster file systems and associated servers, storage arrays and other processing devices. It is to be appreciated, however, that the invention is not restricted to use with the particular illustrative cluster file system and device configurations shown. Accordingly, the term "cluster file system" as used herein is intended to be broadly construed, so as to encompass, for example, distributed file systems, parallel file systems, and other types of file systems implemented using one or more clusters of computers.

Figure 1:
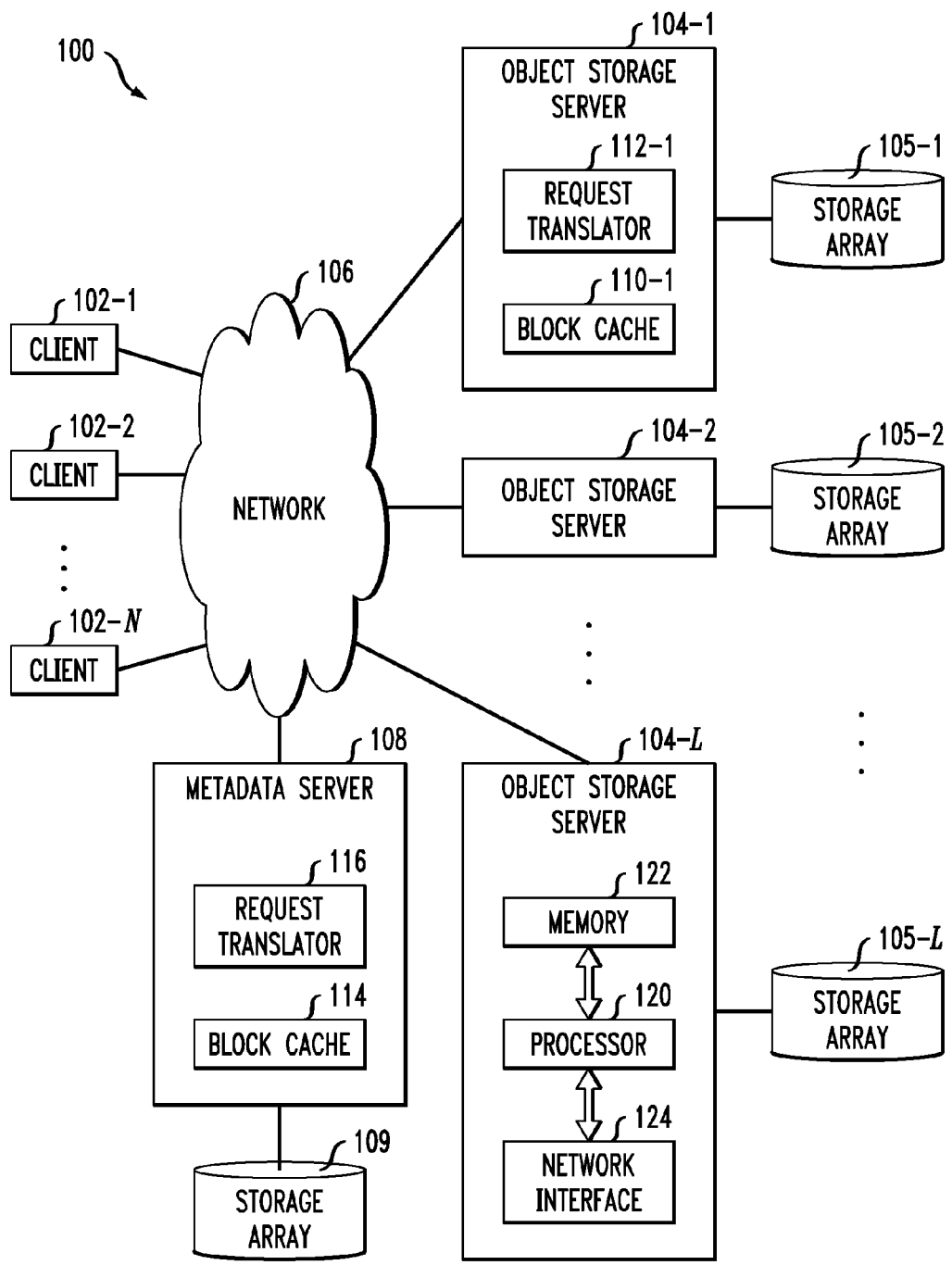
FIG. 1 is a block diagram of a cluster file system that includes server block caches in an illustrative embodiment of the invention.

FIG. 1 shows a cluster file system 100 configured in accordance with an illustrative embodiment of the present invention. The cluster file system 100 comprises a plurality of clients 102-1, 102-2, . . . 102-N and a plurality of object storage servers 104-1, 104-2, . . . 104-L, all coupled to a network 106. The object storage servers 104-1, 104-2, . . . 104-L have associated storage arrays 105-1, 105-2, . . . 105-L. Each of the storage arrays 105 may be viewed as representative of an object storage target of the corresponding one of the object storage servers 104.

Also coupled to the network 106 is a metadata server 108 of the cluster file system 100. The metadata server 108 has an associated storage array 109, which may be viewed as representative of a metadata target of the metadata server 108. Each of the servers 104 and 108 is therefore configured to interface with its associated storage array 105 or 109, and to communicate with one or more of the other servers 104 or 108 and one or more of the clients 102 over the network 106.

The network 106 may comprise, for example, a global computer network such as the Internet, a wide area network (WAN), a local area network (LAN), a satellite network, a telephone or cable network, a cellular network, a wireless network such as WiFi or WiMAX, or various portions or combinations of these and other types of networks.

The object storage server 104-1 comprises a block cache 110-1 and a request translator 112-1 configured to translate IO requests in a protocol of the cluster file system to a format suitable for use with the block cache 110-1. All of the other object storage servers 104-2 through 104-L are assumed to be configured in the same manner, such that each includes block cache and request translator components. Moreover, each such object storage server 104 is also assumed to include processor, memory and network interface components, arranged as specifically illustrated for object storage server 104-L in the figure.

Accordingly, each of the object storage servers 104 comprises a processor 120 coupled to a memory 122. The processor 120 may comprise a microprocessor, a microcontroller, an application-specific integrated circuit (ASIC), a field-programmable gate array (FPGA) or other type of processing circuitry, as well as portions or combinations of such circuitry elements. The memory 122 may comprise random access memory (RAM), read-only memory (ROM) or other types of memory, in any combination.

The memory 122 and other memories disclosed herein may be viewed as examples of what are more generally referred to as "computer program products" storing executable computer program code.

Also included in each object storage server 104 is network interface circuitry 124. The network interface circuitry 124 allows a given such server to communicate over the network 106 with one or more other servers 104 and 108 and with the one or more of the clients 102. The network interface circuitry 124 may comprise, for example, one or more conventional transceivers.

The block cache 110 and request translator 112 in a given one of the object storage servers 104 may be implemented at least in part in the form of software that is stored in memory 122 and executed by processor 120. Also, memory 122 may be viewed as comprising storage elements of the block cache 110.

By way of example, the block cache 110 and request translator 112 may be in the form of a Peripheral Component Interconnect Express (PCIe) card or other type of circuit card installed in a computer that implements the corresponding object storage server 104.

Like each of the object storage servers 104, the metadata server 108 is also configured to include a block cache 114 and a request translator 116. The metadata server 108 and other processing devices referred to herein may also be configured to include processor, memory and network interface components configured in a manner similar to that shown for object storage server 102-L in the figure.

Each of the request translators 112 and 116 is configured to translate IO requests directed to its associated storage array into block IO requests that are processed by the corresponding block cache 110 or 114.

In processing block IO requests, a given read operation associated with a particular one of the IO requests is processed by first attempting to read a data block from the block cache and only reading the data block from the associated storage array if the data block is not available in the block cache. Also, a given write operation associated with a particular one of the IO requests is processed by writing a data block to the associated storage array and caching the data block in the block cache.

Also, the servers 104 and 108 are preferably configured to invalidate contents of their respective block caches under designated failure conditions. Each block cache may also be configured to automatically retrieve valid data from its associated storage array upon restart of its corresponding server after a given failure condition. This will help to reduce server recovery latency.

The block caches 110 and 114 in the present embodiment are assumed to be implemented using a server flash cache, and more particularly a VFCache commercially available from EMC Corporation of Hopkinton, Mass. The VFCache provides enhanced functionality for performing high-speed block read and write operations to an associated storage array while also providing data integrity protection. Additional details regarding VFCache can be found in EMC Corporation, "Introduction to EMC VFCache," White Paper, No. H10502.1, February 2012, pp. 1-31, which is incorporated by reference herein. Other types of server flash cache may be used in other embodiments. It is also possible to utilize server block caches that are based on fast memory types other than flash memory.

The cluster file system 100 may be implemented, by way of example, in the form of a Lustre file system, although use of Lustre is not a requirement of the present invention. Accordingly, servers 104 and 108 need not be configured with Lustre functionality, but may instead represent elements of another type of cluster file system. An example of a Lustre file system configured in accordance with an embodiment of the invention will now be described with reference to FIG. 2.

Figure 2:
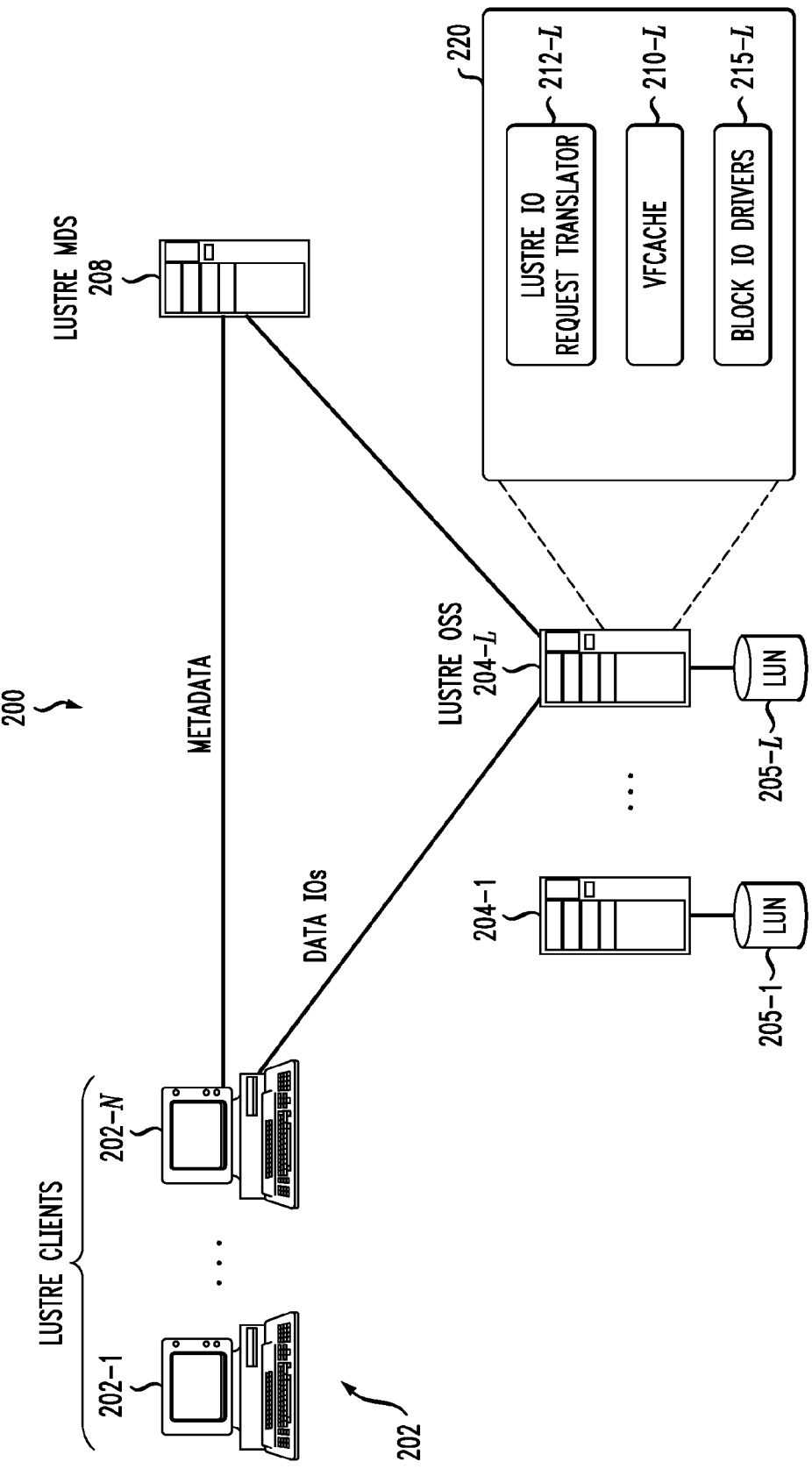
FIG. 2 is a block diagram of another illustrative embodiment of a cluster file system that includes server block caches.

As illustrated in FIG. 2, a Lustre file system 200 comprises a plurality of Lustre clients 202-1, 202-2, . . . 202-N, a plurality of Lustre object storage servers 204-1, 204-2, . . . 204-L, and a Lustre metadata server 208. The Lustre object storage servers 204 and the Lustre metadata server 208 are also denoted in this figure as Lustre OSS and Lustre MDS elements, respectively. The Lustre OSS elements 204-1 through 204-L have as their respective object storage targets or OSTs the respective logical units (LUNs) 205-1 through 205-L. Thus, each OSS in the present embodiment has a single corresponding OST, which may be implemented, for example, as a Small Computer System Interface (SCSI) LUN, or other block storage device or set of such block storage devices for storing file data. A given OSS therefore exposes one or more block storage devices and serves file data objects from those block storage devices, which are collectively referred to as the OST of that OSS. The block storage devices may comprise one or more storage arrays.

By way of example, such storage arrays may comprise storage products such as VNX® and Symmetrix® VMAX, both commercially available from EMC Corporation of Hopkinton, Mass. A variety of other storage products may be utilized to implement at least a portion of the LUNs 205.

The total data storage capacity of the Lustre file system 200 is the sum of all the individual OST capacities represented by LUNs 205-1 through 205-L. The Lustre clients 202 can concurrently access this collective file data storage capacity using data IO requests directed to the OSS elements based on metadata obtained from the MDS. The IO requests and other similar requests herein may be configured in accordance with standard portable operating system interface (POSIX) system calls.

The Lustre MDS 208 also has a storage target, referred to as an MDT, although the MDT is not explicitly shown in the figure. The MDS provides metadata services for the Lustre file system 200, and generally manages a single MDT, which like the OSTs may be implemented as a SCSI LUN. The MDT stores file metadata, such as file names, directory structures, and access permissions.

Additional details regarding conventional aspects of Lustre file systems may be found in, for example, Cluster File Systems, Inc., "Lustre: A Scalable, High-Performance File System," November 2002, pp. 1-13, and F. Wang et al., "Understanding Lustre Filesystem Internals," Tech Report ORNL/TM-2009/117, April 2010, pp. 1-95, which are incorporated by reference herein.

As indicated previously, conventional Lustre OSS and MDS implementations generally do not incorporate an efficient caching mechanism. Instead, IO operations on these servers are generally performed directly with back-end storage arrays. To the extent caching is provided in an OSS or MDS of a Lustre file system or other similar cluster file system, it is typically implemented in a Linux kernel of the server and is therefore limited in both size and functionality.

Moreover, Lustre does not include efficient failure protection modes, and can therefore suffer from excessive recovery latency upon certain types of failures, such as MDS failures.

In the present embodiment, these drawbacks of conventional arrangements are addressed by configuring each OSS 204 and the MDS 208 of Lustre file system 200 to incorporate a server flash cache, and more particularly a VFCache of the type described above.

This advantageous arrangement is illustrated in FIG. 2 for Lustre OSS 204-L, which is shown as comprising a module 220 that includes a VFCache 210-L, a Lustre IO request translator 212-L, and a set of block IO drivers 215-L for interfacing to the LUN 205-L. The Lustre IO request translator 212-L is configured to translate Lustre client IO requests directed to the LUN 205-L into block IO requests that are processed by the VFCache 210. The block IO drivers 215-L are coupled between the VFCache 210-L and the storage array implementing LUN 205-L.

Each additional OSS 204 is assumed to be configured in substantially the same manner, to incorporate a VFCache 210 and associated Lustre IO request translator 212 as well as block IO drivers 215, as illustrated in the figure for OSS 204-L. The module 220 or portions thereof may be implemented in the form of one or more circuit cards that are installed in the OSS.

Also, as indicated above, the MDS 208 is assumed to be configured to incorporate a VFCache 210 and associated Lustre IO request translator 212 as well as block IO drivers 215, arranged in substantially the same manner as illustrated in the figure for OSS 204-L. A module similar to module 220 may be implemented in the form of one or more circuit cards that are installed in the MDS.

The embodiment illustrated in FIG. 2 provides significant improvements in the operation of the Lustre file system 200 by incorporation of a VFCache 210 and associated request translator 212 in each OSS 204 and in the MDS 208. As a result, each OSS can translate Lustre client IO requests into block IO requests and then carry out the corresponding IO operations with the back-end storage arrays. Copies of recently-accessed data will reside in the flash-based VFCache and can be used to satisfy OSS read requests immediately without having to access slower back-end storage arrays.

It should be noted that the Lustre clients 202 will usually implement very aggressive caching of their own. However, the clients typically use a different data access protocol and not a block protocol that can utilize the VFCache acceleration implemented in the OSS and MDS elements in the embodiment of FIG. 2.

Performance is significantly improved when a large number of Lustre clients 202 access the same data blocks that are in the VFCaches 210 of the OSS elements 204. Each Lustre client 202 will typically cache the blocks it uses very aggressively, but it will take some time until the client cache is populated and during this time the required data continues to be read by the client from the OSS elements. The next client accessing the same data will find it in the OSS VFCache and as a result will take less time to populate its client cache. This will continue for additional clients accessing the same data. Thus, the first client access may be slow but access will be increasingly faster for subsequent clients accessing the same data. Accordingly, the more clients there are using the system, the more efficient will be the use of the VFCaches 210 implemented in the OSS and MDS elements.

Significant improvements are also obtained in terms of failure recovery. For example, an OSS can invalidate its associated VFCache under designated failure conditions, thereby preventing stale data from being read. Moreover, the VFCache can automatically repush data upon restart of the OSS, thereby reducing latency on server failure recovery.

Similar performance and failure recovery advantages are provided in the MDS 208, which in the FIG. 2 embodiment is also assumed to incorporate a VFCache and associated request translator.

In other embodiments, the VFCache and associated request translator may be incorporated into just the OSS elements, or only a subset of the OSS elements, or just in the MDS. However, it is expected that maximum benefit relative to conventional practice is achieved when all OSS and MDS elements are configured to include the VFCache and associated request translator.

The cluster file systems 100 and 200 or portions thereof may be implemented using one or more processing platforms each comprising a plurality of processing devices. Each such processing device may comprise processor, memory and network interface components of the type illustrated for server 104-L in FIG. 1.

As indicated above, cluster file system functionality such as that described in conjunction with FIGS. 1 and 2 can be implemented at least in part in the form of one or more software programs stored in memory and executed by a processor of a processing device such as a computer or server. A memory or other storage device having such program code embodied therein is an example of what is more generally referred to herein as a "computer program product." Certain system components are implemented using a combination of software and hardware. For example, a given one of the VFCaches 210 comprises software in combination with flash memory. Other types of server block caches used in embodiments of the invention may be configured in a similar manner.

It should again be emphasized that the above-described embodiments of the invention are presented for purposes of illustration only. Many variations and other alternative embodiments may be used. For example, the disclosed techniques are applicable to a wide variety of other types of devices and cluster file systems that can benefit from server block caching arranged as described herein. Also, the particular configurations of system and device elements shown in FIGS. 1 and 2 can be varied in other embodiments. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
at least one object storage server of a cluster file system;
the object storage server being configured to interface with a storage array;
the object storage server being configured to communicate with one or more additional servers and one or more clients over a network;
the object storage server further comprising:
a block cache;
a request translator configured to translate input-output requests in a data access protocol of the cluster file system to a block protocol format suitable for use with the block cache; and
at least one block input-output driver coupled between the block cache and the storage array;
wherein the request translator is configured to translate client input-output requests directed to an object storage target of the storage array into block input-output requests processed by the block cache;

wherein the object storage server is configured to invalidate contents of the block cache under a designated failure condition;

wherein invalidating the contents of the block cache comprises preventing access to the contents of the block cache; and wherein the block cache is configured to automatically retrieve valid data from the object storage target of the storage array upon restart of the object storage server after a failure of the object storage server.

2. The apparatus of claim 1 wherein the block cache comprises a server flash cache.

3. A processing platform incorporating the apparatus of claim 1.

4. The processing platform of claim 3 comprising a plurality of processing devices with each processing device comprising a processor coupled to a memory.

5. The apparatus of claim 1 wherein the one or more additional servers comprise at least one of a second object storage server and a metadata server.

6. The apparatus of claim 1 further comprising performing a given read operation associated with a particular one of the input-output requests by first attempting to read a data block from the block cache and only reading the data block from the storage array if the data block is not available in the block cache.

7. The apparatus of claim 1 further comprising performing a given write operation associated with a particular one of the input-output requests by writing a data block to the storage array and caching the data block in the block cache.

8. An apparatus comprising:
at least one metadata server of a cluster file system;
the metadata server being configured to interface with a storage array;
the metadata server being configured to communicate with one or more additional servers and one or more clients over a network;
the metadata server comprising:
a block cache;
a request translator configured to translate input-output requests in a metadata access protocol of the cluster file system to a block protocol format suitable for use with the block cache; and
at least one block input-output driver coupled between the block cache and the storage array;
wherein the request translator is configured to translate client input-output requests directed to a metadata target of the storage array into block-input-output requests processed by the block cache;
wherein the metadata server is configured to invalidate contents of the block cache under a designated failure condition;
wherein invalidating the contents of the block cache comprises preventing access to the contents of the block cache; and
wherein the block cache is configured to automatically retrieve valid metadata from the metadata target of the storage array upon restart of the metadata server after a failure of the metadata storage server.

9. The apparatus of claim 8 wherein the one or more additional servers comprise one or more object storage servers.

10. The apparatus of claim 8 wherein the metadata target stores file metadata comprising one or more of a file name, a directory structure and an access permission for each of one or more file data objects.

11. A method comprising:
implementing a block cache in at least one server of a cluster file system, the at least one server being configured to interface with a storage array and to communicate with one or more additional servers and one or more clients over a network; and
translating input-output requests in an access protocol of the cluster file system to a block protocol format suitable for use with the block cache;
wherein at least one block input-output driver is coupled between the block cache and the storage array;
wherein translating input-output requests comprises translating client input-output requests directed to one or more targets of the storage array into block input-output requests that are processed by the block cache;
wherein the at least one server is configured to invalidate contents of the block cache under a designated failure condition;
wherein invalidating the contents of the block cache comprises preventing access to the contents of the block cache;
wherein the block cache is configured to automatically retrieve valid data or metadata from the one or more targets of the storage array upon restart of the at least one server after a failure of the at least one server; and
wherein the at least one server comprises at least one of an object storage server and a metadata server.

12. The method of claim 11 further comprising performing a given read operation associated with a particular one of the input-output requests by first attempting to read a data block from the block cache and only reading the data block from the storage array if the data block is not available in the block cache.

13. The method of claim 11 further comprising performing a given write operation associated with a particular one of the input-output requests by writing a data block to the storage array and caching the data block in the block cache.

14. The method of claim 11 wherein the one or more targets comprise at least one of an object storage target of the object storage server and a metadata storage target of the metadata server.

15. A computer program product comprising a non-transitory processor-readable storage medium having encoded therein executable code of one or more software programs, wherein the one or more software programs when executed cause at least one server to perform the steps of:
implementing a block cache in the at least one server of a cluster file system, the at least one server being configured to interface with a storage array and to communicate with one or more additional servers and one or more clients over a network; and
translating input-output requests in an access protocol of the cluster file system to a block protocol format suitable for use with the block cache;
wherein at least one block input-output driver is coupled between the block cache and the storage array;
wherein translating input-output requests comprises translating client input-output requests directed to one or more targets of the storage array into block input-output requests that are processed by the block cache;
wherein the at least one server is configured to invalidate contents of the block cache under a designated failure condition;
wherein invalidating the contents of the block cache comprises preventing access to the contents of the block cache;

wherein the block cache is configured to automatically retrieve valid data or metadata from the one or more targets of the storage array upon restart of the at least one server after a failure of the at least one server; and wherein the at least one server comprises at least one of an object storage server and a metadata server.

16. The computer program product of claim 15 further comprising performing a given read operation associated with a particular one of the input-output requests by first attempting to read a data block from the block cache and only reading the data block from the storage array if the data block is not available in the block cache.

17. The computer program product of claim 15 further comprising performing a given write operation associated with a particular one of the input-output requests by writing a data block to the storage array and caching the data block in the block cache.

* * * * *